(No Model.)
C. W. HUNT.
MEANS FOR PROPELLING CHAINS.
No. 500,807. Patented July 4, 1893.
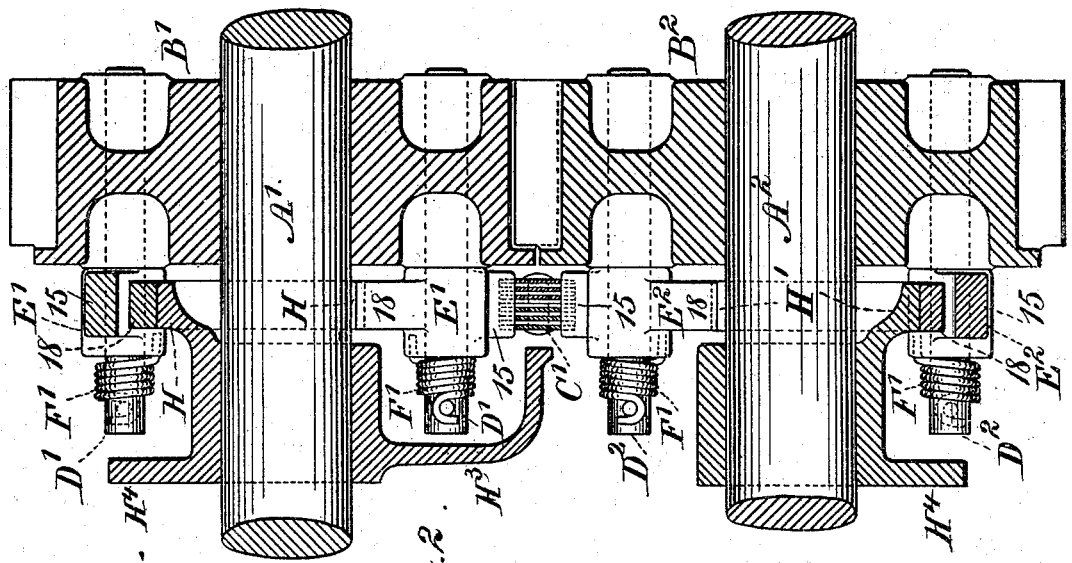
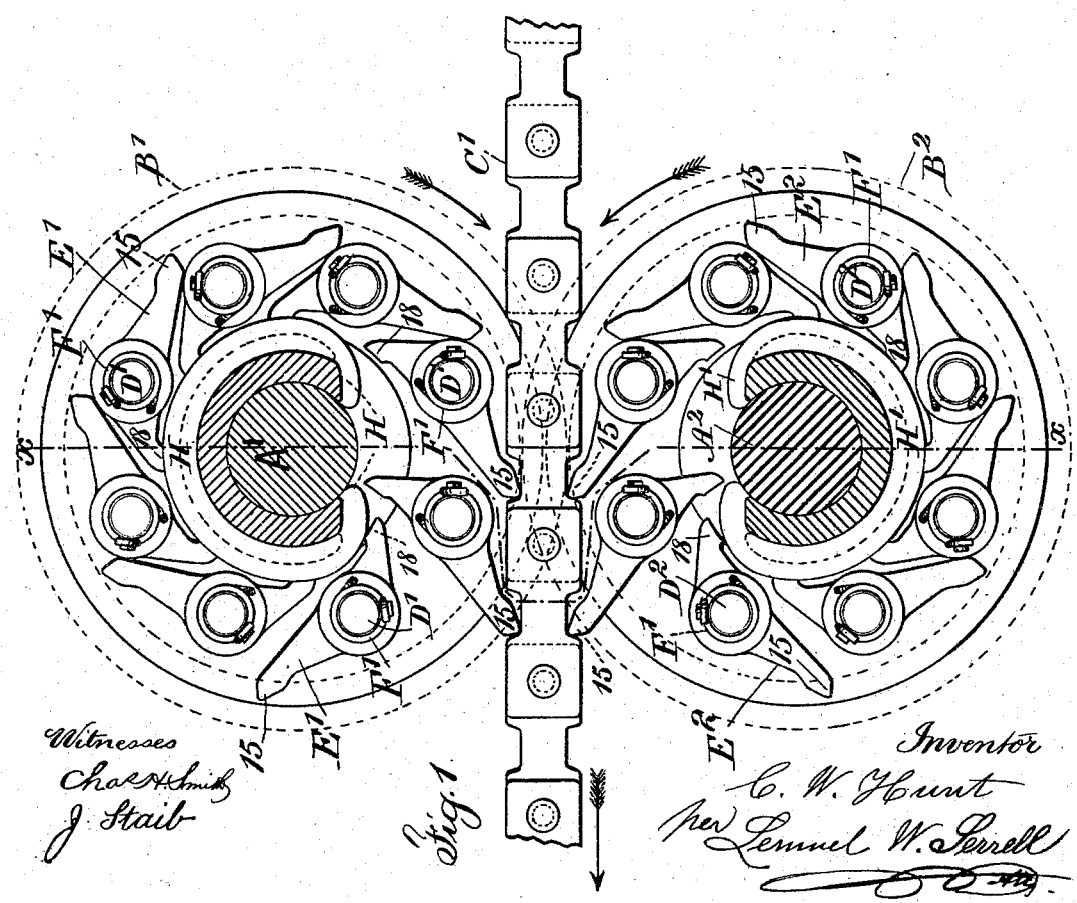
Witnesses
Chas H Smith
J. Staib
Inventor
C. W. Hunt
per Lemuel W. Serrell

UNITED STATES PATENT OFFICE.

CHARLES W. HUNT, OF WEST NEW BRIGHTON, NEW YORK.

MEANS FOR PROPELLING CHAINS.

SPECIFICATION forming part of Letters Patent No. 500,807, dated July 4, 1893.

Application filed March 20, 1893. Serial No. 466,881. (No model.)

*To all whom it may concern:*

Be it known that I, CHARLES W. HUNT, a citizen of the United States, residing at West New Brighton, in the county of Richmond and State of New York, have invented an Improvement in Means for Propelling Chains, of which the following is a specification.

This invention is especially adapted to giving motion to the endless chains that are used in conveyers that are provided with buckets for conveying grain, coal, ore, ashes or other materials from one place to another.

In Letters Patent No. 425,798, granted to me, a pawl mechanism is represented that is adapted to engage the chains of endless chain conveyers and propel the same. In my present invention I arrange two pawl wheels, one at each side of the chain that is to be moved, the ends of the pawls of said wheels coming at opposite sides of the chain and giving motion to the same progressively, and each pawl takes its proper proportion of the strain in moving the chain.

In the drawings, Figure 1 is an elevation of a portion of a chain to be propelled and of the pawls for acting upon the same, the propelling shafts being in section. Fig. 2 is a section at right angles to Fig. 1 through the line $x\ x$.

The shafts $A'$ and $A^2$ may be geared together by the gear wheels $B'\ B^2$, but any suitable mechanism may be employed for causing the shafts $A'$ and $A^2$ to revolve together, or the wheels $B'\ B^2$ may revolve around the shafts, the latter being stationary.

Upon each wheel $B'$ or $B^2$, there is a circular range of pawls, the pawls $E'$ being upon the wheel $B'$ and the pawls $E^2$ upon the wheel $B^2$, and the pawls are pivoted so as to swing outwardly. I have represented the pivot pins $D'$ and $D^2$ as projecting from the respective wheels $B'$ and $B^2$, and it is advantageous to make use of springs for throwing the operative ends of the pawls outwardly. I have represented springs $F'$ as coiled around the respective pivot pins and connected thereto at one end, while the other end acts upon the pawl, and any suitable mechanism may be employed to form a stop for limiting the outward projection of the moving ends 15 of such pawls $E'$ and $E^2$. It will now be apparent that when such wheels $B'$ and $B^2$ are rotated in the direction of the arrows indicated in Fig. 1, the ends of the pawls $E'$ or $E^2$ act in succession against the projections upon the chain $C'$ and give motion to the same in the direction indicated by the arrows. The chain $C'$ is represented as made of plate links with notches in the opposite edges, but the chain may be of any desired character, and under all circumstances the operative ends 15 of the pawls are to be shaped so as to properly engage the chain, and such ends may pass into the notches in the chain, as represented, or they may pass into recesses in the chain or between the links thereof, and act upon the links or upon the pivot pins or rivets uniting the respective links, and in consequence of the pawls coming around successively and in pairs, one pawl at each side of the chain, the operative ends of the pawl will take their proper proportion of strain in propelling the chain, because such pawls will move either outwardly or inwardly as they take the respective bearings upon the chain, and if one pawl receives more strain than the opposite pawl, the pawl that receives the most strain will turn upon its pivot and press against the chain until the chain is brought properly against the operative end of the opposite pawl to take the proper proportion of strain thereon.

I find it advantageous to allow the pawls to turn freely while acting upon the chain to propel the same, in order that the pawls may take their proper proportion of strain, the inner ends, however, of such pawls are advantageously made with the stop projections 18 and these come into contact with the cams $H\ H'$ respectively, which cams occupy stationary positions around the respective shafts $A'\ A^2$, so as to act upon the inner ends of the pawls 18 to move the outer ends of such pawls inwardly and to keep the outer ends retracted until the said outer ends are adjacent to the chain at the opposite sides thereof, at which points the inner ends 18 of such pawls clear the respective cams $H\ H'$ and allow the pawls freely to accommodate themselves to the chain and to take the proper strain thereupon. I have represented the respective cams $H$ and $H'$ as extending outwardly from hubs which surround the shafts $A'\ A^2$, and there are shields $H^3\ H^4$ upon such hubs which serve the purpose of lessening the risk of pieces of coal, sand, gravel or other material falling upon the pawls or their pivots or upon the chain as it passes through between the pawls.

Under all circumstances it will be observed that the pair of pawls which is nearest in line between the axes of the shafts $A'$ $A^2$, are the most efficient in giving motion to the chain, and that the pawls which have been acting and have passed beyond this point gradually draw back from the chain and their outer ends are not moving as fast as the chain. Hence the pressure is relieved and the pawls are free to be swung inwardly by the action of the respective cams.

A moving chain may be used to give motion to the two wheels $B'$ $B^2$ through the pawls that engage the moving chain.

I claim as my invention—

1. The combination, with a chain, of two wheels and a circular series of pawls on each wheel, one at each side of the chain, the chain being between the outer ends of the pawls, so as to be acted upon by such operating pawls, substantially as set forth.

2. The combination, with a chain, of two wheels at opposite sides of the chain, a circular series of pawls upon each of such wheels, and springs acting on such pawls, the chain being between the outer ends of the operating pawls and in contact with them, substantially as set forth.

3. The combination, with a chain having recesses in the opposite sides thereof, of two wheels and a circular range of pawls on each wheel, a pivot pin for each pawl, springs for moving the ends of the pawls outwardly and cams for retracting the other ends of the pawls, substantially as set forth.

4. The combination, with a chain having recesses in the opposite sides thereof, of two wheels and a circular range of pawls on each wheel, a pivot pin for each pawl, springs for moving the ends of the pawls outwardly, and cams for retracting the outer ends of the pawls, and guards connected with the cams and protecting the pawls, substantially as set forth.

Signed by me this 15th day of March, 1893.

CHAS. W. HUNT.

Witnesses:
GEO. T. PINCKNEY,
WILLIAM G. MOTT.